Feb. 23, 1960  M. A. CROZIER  2,925,607
BELT FOR WEARING APPAREL
Filed May 3, 1957  2 Sheets-Sheet 1
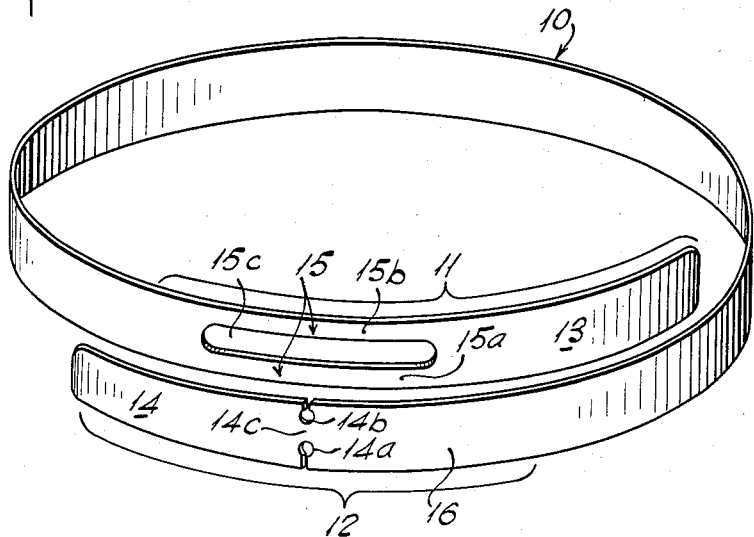
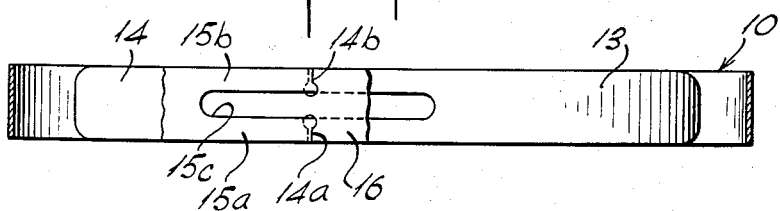
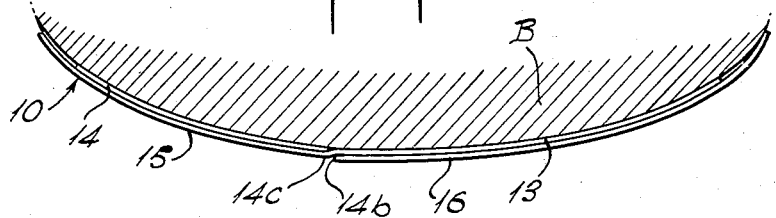
INVENTOR
MICHAEL A. CROZIER
BY
Eyre, Mann + Lucas
ATTORNEYS

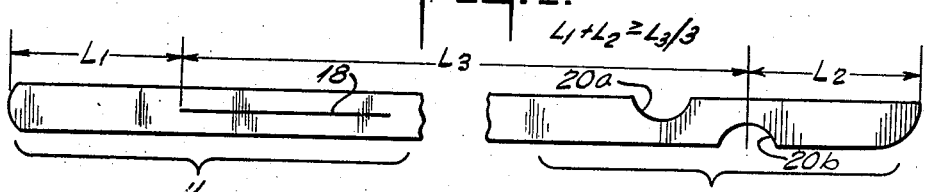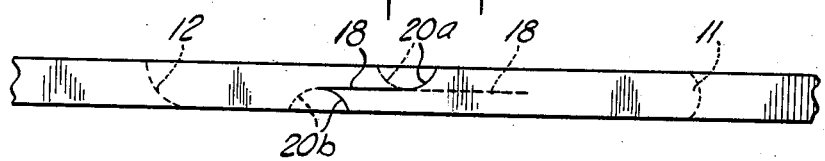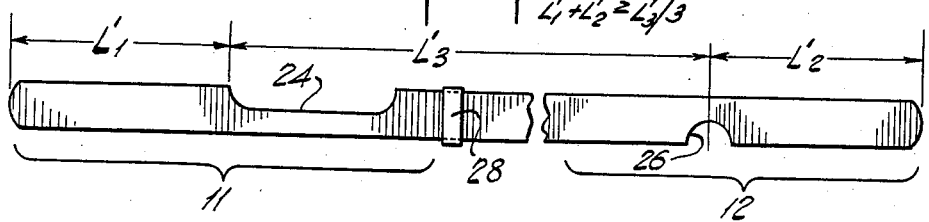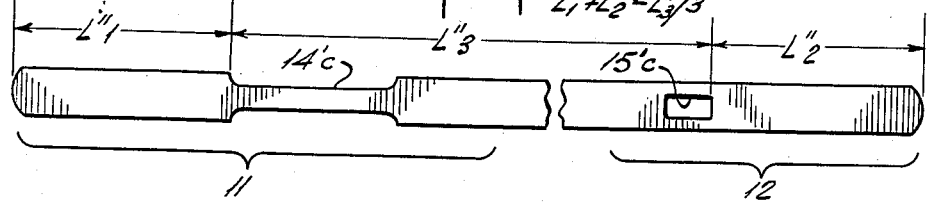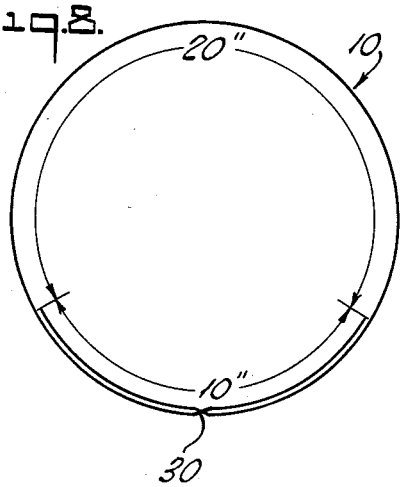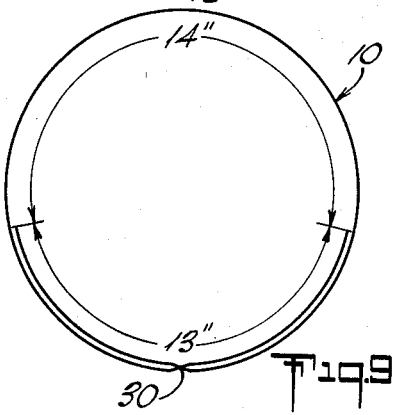

United States Patent Office 2,925,607
Patented Feb. 23, 1960

2,925,607
BELT FOR WEARING APPAREL
Michael A. Crozier, Mount Vernon, N.Y.
Application May 3, 1957, Serial No. 656,794
6 Claims. (Cl. 2—321)

The present invention relates to belts for personal wear and comprises a novel belt which is continuously and readily adjustable over a relatively wide range, requires no buckles, clamps or other attached devices, is neat in appearance, comfortable to use, and inexpensive to manufacture.

In general, the new belt comprises a strap of suitable material and length so constructed that a cross-over can be effected at a substantial distance from each end to cause the end portions to underlie corresponding lengths of the strap and to overlie the body of the user. The outward pressure of the wearer's body against the double layer of the strap at the crossed over end portions has been found entirely adequate to keep a belt of such construction securely in position provided there is a sufficient length of such double layer. Although the minimum length of the crossed-over end portions, or resulting double strap layer when the belt is in use, depends to some extent upon the surface friction characteristics of the belt material, and to a limited extent upon the belt width, it has been found that for practically any suitable belt material such length should not be substantially less than one-third of the waist measure. In other words, the total length of the belt should be at least four-thirds of the maximum waist measure and the belt construction should be such as to permit cross-over sufficiently spaced from the ends to provide the necessary minimum length of double layer.

The invention will be better understood by reference to the accompanying drawings which illustrate belt constructions embodying the invention. The various embodiments of the invention illustrate different specific means for providing cross-over of the belt end portions, each of which permits continuous adjustment of size over a relatively wide range.

Fig. 1 is a perspective view of a belt embodying the invention shown in unsecured relation with the end parts displaced from each other to show more clearly dimensional relations between the several parts;

Fig. 2 is a front elevation of the belt of Fig. 1 in one position of secured together relation, certain parts being broken away;

Fig. 3 is a horizontal sectional view of the belt of Fig. 1 showing the belt in use;

Fig. 4 is a plan view, with the central section removed, of a belt representing another embodiment of the invention;

Fig. 5 is a front view of the belt of Fig. 4 with the ends crossed over as in use;

Figs. 6 and 7 are plan views similar to Fig. 4 but representing other embodiments of the invention; and Figs. 8 and 9 are diagrams representing any one of the belts of Figs. 1 through 7 adjusted, respectively, for maximum and minimum girth, and explanatory of the necessary dimensional relationships of the length of the belt to the end portions and to the waist measure.

In Fig. 1 the belt as a whole is indicated by 10. The belt is of uniform width throughout its length and is of a length which is over four-thirds the maximum waist of the wearer. The end portions of the belt which, when the belt is in use, overlap corresponding lengths of the belt proper are indicated with the aid of brackets by the reference characters 11 and 12 respectively. Belt securing end 11 has a long plane or flat gripping part 13 which, as shown in Fig. 2, is to underlie and engage flatwise the other end belt portion 12. Adjacent the long part 13 is a long plane part 15 which is divided into two relatively wide, preferably of equal width, spaced parallel elements 15a and 15b each of substantial area, separated by an equally long cutout 15c also of substantial width. The cutout 15c is of uniform width and is easily punched out or otherwise cut by relatively simple tools, and as better appears from Fig. 2 the cutout 15c has its longitudinal axis or center line coincident with the center line of the belt itself.

Belt securing end 12 has a long plane or flat gripping part 14 which is to underlie and engage flatwise the other end belt portion 11. The length of the part 13 is somewhat longer than the long cutout 15c. At the inner terminus of long flat part 14, that is at the right hand end as seen in Figs. 1 and 2, two transverse slits 14a and 14b are provided. These slits 14a and 14b are cut from and are open ended in the respective longitudinal edges of the belt. They provide respective spaces for accommodating the parallel parts 15a and 15b for passage therethrough, at any point in their respective lengths, from the front face of belt portion 12 to the rear face of the latter and they may be transversely aligned as in Figs. 1 and 2 in which case they preferably are of respective depths and widths substantially matching the respective widths and thicknesses of the long parallel elements 15a and 15b, leaving an intermediate part 14c that is of about the same width as the width of the long cutout 15c. To the right of the parts 14a, 14c and 14b is a flat portion 16 of part 12.

In putting on the belt, the long flat end part 14 of the belt end 12 is passed through the cutout 15c of the end part 11 and is brought flatwise into overlapping relation to the parts 15a, 15b and 15c of the portion 15 with the parallel long spaced elements 15a and 15b respectively entering the open ended slits 14a and 14b, thus bringing the outer surface of gripping part 13 against the inner surface of the belt, including a substantial length of part 12 thereof. The outer surface of end part 14 similarly is brought into engagement with the inner surface of the belt, including a substantial length of part 15.

For maximum girth the slits 14a and 14b will receive the strips 15a and 15b adjacent the right hand (as shown in Figs. 1 and 2) of the slot 15c. Conversely, for minimum girth, the slits 14a and 14b will receive the strips 15a and 15b adjacent the left hand end of the slit 15c. For any girth intermediate the maximum and minimum girths the cross-over point will be at a corresponding intermediate position along the slot 15c.

When the belt is properly adjusted for fit and comfort there is sufficient outward pressure exerted by the body of the wearer to cause frictional grip between the engaged surfaces of the belt, and such frictional grip irrespective of the position of the cross-over, holds the belt in adjusted position.

As shown in Fig. 3, where the body of the wearer of the belt is indicated at B, the long part 14 always underlies the belt proper and tension on the belt, caused by the outward pressure of the body B, compresses the part 14 flatwise between the body and the belt proper causing no-slip gripping between the two. So much of the outer surface of parallel elements 15a and 15b as are disposed against the inner surface of the part 14 are similarly grip-pressed thereagainst to aid in holding the belt against slippage and long part 13 at the other belt end similarly underlies flatwise the belt proper and, as a result of the pressure of the body B, is compressed against the belt to provide a no-slip grip.

In the construction of the belt illustrated in Figs. 1–3 the range of adjustment corresponds to the length of the parallel sided slot 15c. Through this range the belt size is continuously adjustable. At any position along the slot 15c of the slits 14a and 14b the belt will be held in adjusted position provided the length of the overlap, when the belt is adjusted for near maximum girth, is such that there still remains the necessary minimum of one-third the waist measure in the double layer. Thus, if the belt is to be adjustable through a range of 4", for a 26" to a 30" waist, the total belt length should be at least 40", that is 30" plus ⅓ of 30".

Figs. 4 and 5 illustrate another belt embodying the invention which is similar in many respects to the belt of Figs. 1 to 3. In this embodiment of the invention, the end portion 11 of the belt is provided with a narrow long slit 18 instead of the relatively wide long slit 15c of the belt of Fig. 1 and the other end 12 of the belt is provided with two longitudinally spaced cutouts 20a and 20b which serve the function of the slits 14a and 14b. The cutouts 20a and 20b extend from the upper and lower longitudinal edges of the belt, respectively, to the center line of the belt. In the particular configuration illustrated, the cutouts are arcuate in shape. To fasten the belt, the end 12 is turned upwardly and then inserted through the slot 18 from the outer to the inner surface to bring the forward or left side of each cutout (as viewed in Fig. 5), to the inner surface of the belt. When adjusted for maximum girth the left edge of cutout 20a engages the right hand end of the slot 18 whereas for minimum girth the right side of cutout 20b engages the left end of slot 18. With this construction the range of adjustment is thus less than the length of the slot 18 due to the fact that the cutouts 20a and 20b are longitudinally spaced. In this construction because practically no material is removed in forming the slot 18 the strength of the belt, over the area of the slot, is conserved. A further advantage in the construction illustrated in Figs. 4 and 5, because of the longitudinal spacing of the cutouts, is that there is practically no tendency for the belt ends to come out of alignment with the belt proper. The length of the belt of Figs. 4 and 5, like that of the belt of Figs. 1 to 3 is such as to insure a double layer of belt at any adjusted position equal in length to at least one-third of the waist measure at such adjusted position. This condition is fulfilled when the length $L_1$, from one end of the belt to the adjacent end of slot 18 plus the length $L_2$ from the other end of the belt to the base of cutout 20b is equal to or greater than one-third the length $L_3$, where $L_3$ is the remaining length of the belt. The lengths $L_1$, $L_2$ and $L_3$ and the necessary relation therebetween are indicated in Fig. 4.

In Fig. 6 is shown a belt construction which embodies certain features of the belt of Figs. 4 and 5. In this embodiment of the invention the end portion 11 is cut away for a substantial length along the upper longitudinal edge up to substantially the center line or axis of the belt as indicated at 24. In end portion 12 a single cutout 26 is provided at the lower longitudinal edge of the belt, the cutout 26 also extending to the center line of the belt, and preferably being arcuate as shown. The construction of Fig. 6 removes the necessity for inserting one belt end through an opening in the other belt end for crossing over of the end portions. If desired, to maintain the belt ends in alignment when the belt is in adjusted position on a wearer a loop 28 for reception of the end portion 12 may be secured to the inner surface of the belt at the junction of end portion 11 with the body portion of the belt. The range of adjustment in the embodiment of the invention in Fig. 6 is determined by the length of the base of the cutout 24. To insure adequate gripping for maximum girth, the length $L'_1$ from an end of the belt to the adjacent end of cutout 24 plus the length $L'_2$ from the other end of the belt to the base of cutout 26 must be equal to or greater than one-third the length $L'_3$ of the remainder of the belt as indicated in the drawing.

The embodiment of the invention illustrated in Fig. 7 corresponds to the belt of Figs. 1 to 3, being a mere reversal of parts, or more strictly speaking, a change in dimensions. Instead of a long slot in one end part and a short junction or part of restricted width in the other end part, as in the belt of Fig. 1, the belt of Fig. 7 has a relatively short slot $15'_c$ in end part 12 and a relatively long junction part $14'_c$ of a width equal to the width of the slot $15'_c$ in end part 11. When $L''_1$ plus $L''_2$ is equal to, or greater than one-third of $L''_3$, the belt is continuously adjustable through a range equal to the length of the portion $14'_c$ of restricted width. The length of slot $15'_c$ need only be sufficient for passage of the other end of the strip therethrough.

As illustrative of the relative dimensions of the belt parts in any one of the embodiments of the invention previously illustrated, Fig. 8 shows in diagrammatic manner a belt of overall length of 40" adjusted for a maximum waist measure of 30". Fig. 9 shows the same belt adjusted for a waist measure of 27". The length of the double layer of belt corresponding to the underlying sections of the belt in Fig. 8 is 10" whereas the remaining length of the belt is 20", giving a waist measure of 30". In Fig. 9 the same belt has been adjusted for 27" waist in which case the double layer of belt has a length of 13".

In Figs. 7 and 8 the cross-over 30 is shown at an equal distance from the ends of the belt. Obviously the two end portions of the belt need not be of equal length as it is the total length rather than the separate lengths of the two end portions which determine the amount of overlap. When the end portions are equal in length, there is less tendency for the belt ends to come out of alignment with the belt when the belt is in adjustment for the minimum waist measure.

The invention has now been described with reference to various embodiments thereof. The embodiments illustrate various different constructions of the cross-over means for the belt ends, each of which permits continuous adjustment of belt size over a relatively wide range of adjustment. In each of the illustrated embodiments, the cross-over construction is such that at each end of the range of adjustment an edge of a cutout or slot on the cross-over means of one end part of the belt abuts an edge of the cross-over means on the other end part of the belt thereby apparently fixing the limits of the range over which the belt is continuously adjustable. As it is frictional resistance and cohesion between overlapped layers of the belt that maintain the belt in place on the wearer even when adjusted for maximum girth, the upper limit of the range of adjustment for any belt construction depends upon the length of overlap as heretofore defined. Thus the cross-over means of the belt ends need not be so constructed that at the maximum girth to which the belt could be operatively adjusted there is abutment of edges on the belt end portions. More specifically, if the slot 18 of the belt of Fig. 4 were extended to the left so that the distance between the belt end and the adjacent end of the slot were less than $L_1$ there would be no abutment of edges at maximum girth if $L_1$ and $L_2$ equalled but did not exceed $L_3/3$. The same situation would exist if, in the embodiment of Fig. 1, the slot 15c were extended toward the adjacent end of the belt or if, in the embodiment of Fig. 6, the cutout 24 were extended toward the adjacent end of the belt or in the embodiment of Fig. 7 the restricted portion $14'_c$ were extended toward the adjacent end of the belt.

In each of the illustrated embodiments, the cooperatively shaped cutouts which provide the means for cross-over of the end portions of the belt, comprise one relatively long cutout in one end portion of the belt and one or more relatively short cutouts in the other end portion of the belt, the long cutout determining at least in part, the range of adjustment of the belt. Obviously, as the range of adjustment is a function of the sum of the lengths of the cooperating cutouts, and the maximum adjustment is determined by the length of overlap it is not essential that the cutouts be of unequal length. Other variations within the spirit of the invention and the scope of the accompanying claims will occur to those skilled in the art. The particular belt material is not critical. Leather, plastics, cloth, etc., may be employed. Extruded synthetic plastic strip material has been found particularly suitable for use. If it is desired to use material having little or no surface friction characteristics for the body of the belt, obviously the outer surfaces of so much of the belt ends that underlie the body of the belt at maximum girth and/or parts of the inner surface of the belt normally engaged by the belt ends, could be coated or otherwise covered with a layer of other material of suitable surface friction characteristics.

As frictional gripping and cohesion between surfaces is a function of area of contact it would seem that the belt width should have substantial influence upon the necessary length of overlap to insure good gripping contact between the overlying end portions of the belt and the undersurface of the belt. Nevertheless, belt width has been found to be of relatively little importance in determining the proper proportions of the new belt. It is believed that the reason that length, rather than area, is important is because muscular movement of the wearer which influences the pressure exerted upon the belt is ordinarily relatively localized. For this reason it has been found essential for proper gripping action of the belt, that the gripping area be extended over a substantial length of the waist.

The present application is a continuation-in-part of application Serial No. 374,297, filed August 14, 1953, now abandoned.

The following is claimed:

1. A buckle-less apparel belt comprising a strip of flexible material of a length at least about one-third greater than the maximum girth of a body to be encircled, said strip having cooperatively shaped cutouts therein spaced from the ends of the strip and permitting the ends of the strip to be mutually crossed over and brought into underlying relation to the inner surface of the strip and in frictional engagement therewith under pressure of the body to be encircled, said cutouts having a combined depth, measured transversely of the strip, substantially equal to the width of the strip, one of said cutouts being elongated along the length of the strip, said cutouts being shaped and located to permit continuous adjustment from a maximum waist size when the total underlying length of the belt ends is about one-third of the waist size to a substantially smaller waist size where the total underlying length of the belt ends is substantially greater than one-third the waist size, said belt being held in any adjusted position substantially solely by the frictional grip between the outer surfaces of the strip ends and the inner surface of the strip engaged thereby when gripped pressed together under pressure of the body to be encircled, and the strip ends beyond said cutouts being imperforate and having continuous uninterrupted outer surfaces.

2. The buckle-less belt according to claim 1 wherein one of said cooperatively shaped cutouts is a closed ended slot symmetrical about the medial line of the strip and dimensioned for passage therethrough of the remote end of the strip and the other of said cutouts comprise plural cutouts which are open ended at the opposite sides of the strip and terminate short of the medial line of the strip to leave a strip section of a width substantially equal to the transverse width of said closed end slot, said open ended cutouts being long enough to provide a wide range through which the belt is continuously adjustable.

3. The buckle-less belt according to claim 1 wherein said cooperatively shaped cutouts comprise an elongated parallel sided longitudinally disposed slot spaced from one end of the strip and a single pair of transverse slots open at opposite edges of the strip and spaced from the other end of the strip, the depth of each transverse slot being substantially equal to the width of the strip material between the elongated slot and the edge of the strip, the strip material between the elongated slot and the edges of the strip being received in said transverse slots when the belt ends are crossed over for use.

4. The buckle-less belt according to claim 3 wherein said transverse slots are equally spaced from the adjacent end of the strip, and wherein the length of the strip between one end and the adjacent end of the elongated slot plus the length of the strip between the other end of the strip and said transverse slots is at least as great as one-third the remaining length of the strip whereby the belt is continuously adjustable throughout a range equal to the length of said elongated slot.

5. The buckle-less belt according to claim 3 wherein said transverse slots are longitudinally spaced so as to be at different distances from the adjacent end of the strip and wherein the length of the strip between one end and the adjacent end of the elongated slot plus the length of the strip between the other end of the strip and the base of the nearer of said transverse slots is at least as great as one-third the remaining length of the strip whereby the belt is continuously adjustable throughout a range equal to the length of the elongated slot less the spacing between said transverse slots.

6. A buckle-less apparel belt comprising a strip of flexible synthetic plastic material of a length at least about one-third greater than the maximum girth of a part to be encircled, said strip having a medial opening therethrough spaced from one end and a medial narrow junction part spaced from the other end and having a transverse dimension substantially equal to that of said opening, said opening and junction part having different lengths, said opening and junction part being complementarily shaped to permit mutual cross-over of the strip ends at the opening to bring the outer surfaces of the strip ends into contact with the inner surface of the strip and to permit continuous adjustment of girth over a given range by relative movement of the junction part and opening, said belt being held in any adjusted position substantially solely by the frictional grip between the outer surfaces of the strip ends and the inner surface of the strip engaged thereby when grip pressed together under pressure of the part encircled and the strip ends beyond said opening and junction part being imperforate and having continuous uninterrupted outer surfaces.

References Cited in the file of this patent

UNITED STATES PATENTS

| | | |
|---|---|---|
| Re. 2,449 | Lee | Jan. 8, 1867 |
| 410,446 | Rich | Sept. 3, 1889 |
| 554,446 | Jones | Feb. 11, 1896 |
| 1,697,270 | Fischer | Jan. 1, 1929 |
| 2,113,731 | Kennedy | Apr. 12, 1938 |
| 2,430,957 | Seitz | Nov. 18, 1947 |

FOREIGN PATENTS

| | | |
|---|---|---|
| 26,746 | Great Britain | of 1913 |
| 741,529 | Germany | Nov. 12, 1943 |